Patented Feb. 20, 1951

2,542,796

UNITED STATES PATENT OFFICE 2,542,796

N-ETHYLPIPERIDINE SALT OF PENICILLIN G

Donald J. Cram, Cambridge, Mass., and Max Tishler, Rahway, N. J., assignors to Merck & Co., Inc., Rahway, N. J., a corporation of New Jersey No Drawing. Application September 11, 1946, Serial No. 696,350

5 Claims. (Cl. 260—239.1)

This invention relates to the isolation and purification of penicillin G from a mixture of various types of penicillin. More particularly, it is concerned with the preparation of novel derivatives of penicillin G which permit their ready separation.

It has been established with reasonable certainty that penicillin G, sometimes referred to as benzyl penicillin, has the structural formula

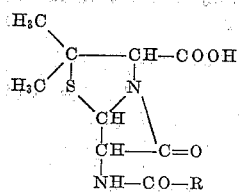

wherein R represents the benzyl group $$(-CH_2-C_6H_5)$$

Other forms of penicillin are of similar structure differing only in that the benzyl group is replaced by other monovalent organic radicals, generally radicals having five or more carbon atoms. Penicillins, such as penicillin F, wherein R is $\Delta^2$-pentenyl ($-CH_2-CH=CH-CH_2-CH_3$); dihydropenicillin F, wherein R is n-amyl; penicillin X, wherein R is p-hydroxy benzyl and penicillin K, wherein R is n-heptyl have been identified. Although both saturated and unsaturated hydrocarbon radicals at R in the above formula give products having penicillin activity, it has been found that penicillin G is more efficacious than some of the other forms in therapy.

Penicillin is produced commercially as a mixture of these various types containing pigments and extraneous material. Since penicillin G is one of the most active forms, it is desirable that it be separated from the less active types as well as extraneous impurities.

In accordance with one method of isolating penicillin G, described in a penicillin report submitted by the Heyden Chemical Corporation to the O. S. R. D. (O. S. R. D. No. H–II 5–22–44 and O. S. R. D. No. H–III 6–15–44), an ether solution of triethylamine was added to an ether solution of crude penicillin and a precipitation of impurities effected. Upon further addition of an ether solution of triethylamine to the penicillin solution, a mixture of oil and crystals formed. The ether was decanted from the crystals and the white crystals of triethylamine penicillin washed with acetone. A procedure for conversion from the triethylamine penicillin salt to the sodium salt was recorded. It consisted of dissolving the triethylamine salt in water, acidifying, extracting into ether, and back into water by the portionwise addition of sodium hydroxide. This mixture was then frozen, dried under vacuum and recrystallized from butanol and water. The above procedure, however, does not give high yields of penicillin G and is therefore not economical for manufacture.

It is an object of this invention to provide a practical process for the isolation and purification of penicillin G from a mixture, which can be readily carried out and does not result in significant losses of penicillin.

Regarded in certain of its broader aspects the process in accordance with the present invention comprises treating an organic solvent solution of penicillin acid with an organic solvent solution of an N-substituted heterocyclic amine to form the tertiary amine salt of penicillin G, recovering the latter compound, dissolving this salt in an aqueous organic mixture, reacting the latter mixture with an alkali forming hydroxide and recovering the corresponding alkali salt of penicillin G from the aqueous phase.

Solutions of penicillin G to be treated by the process of the present invention may result from previous isolation operations or may be prepared by dissolving a salt of penicillin in water, acidifying and extracting into an immiscible organic solvent.

Any organic solvent solution can be employed as the solvent medium for the salt formation in the practice of the present invention provided that the N-substituted heterocyclic amine salt of penicillin G is insoluble therein. We prefer amyl acetate, ether or a mixture of amyl acetate and acetone as the solvent medium.

Examples of N-substituted heterocyclic amines which are suitable for our invention are N-methylpiperidine, N-ethylpiperidine, N-methylmorpholine and N-ethylmorpholine.

By the term "alkali-forming" hydroxide as used herein is meant any alkali metal or alkali earth metal hydroxide.

In accordance with a preferred embodiment of the present invention sodium penicillin, which is a mixture of various types of penicillin together with pigments and extraneous materials, is dissolved in water and the solution diluted with amyl acetate. This mixture is reacted with sufficient phosphoric acid to adjust the pH of the solution to about 2.7. In order to avoid decomposition of the penicillin, it should be noted that this reaction and subsequent reactions are carried out at approximately 0° C. The sodium penicillin is thus converted to free penicillin acid and is extracted into the amyl acetate. The immiscible liquids are separated and the aqueous layer treated with additional amyl acetate and phosphoric acid in order to recover any active penicillin which might remain in the aqueous layer. The amyl acetate extracts are combined, washed, dried with anhydrous sodium sulfate and the solution diluted with acetone. The mixture of amyl acetate and acetone containing the penicillin acid is reacted with N-ethylpiperidine dissolved in acetone. The mixture is stirred for about one hour during which time the crystallization of the N-ethylpiperidine salt of penicillin G is completed. The pale yellow crystals are recovered, sucked dry and finally dried at 25° C. in vacuo.

N-ethylpiperidine is an essentially quantitative precipitant for penicillin G. In general the N-ethylpiperidine salt of penicillin G obtained in accordance with the present invention is essentially pure but contains small but varying amounts of pigments depending on the purity of the starting material. Several procedures for the ultimate purification of the N-ethylpiperidine salt of penicillin have been developed. In accordance with one method, crude N-ethylpiperidine salt of penicillin G is crystallized from a chloroform-acetone solution. This is accomplished by first dissolving the salt in chloroform. The solution thus formed is then treated with a saturated aqueous sodium chloride solution, whereby most of the pigment impurities are extracted together with insignificant amounts of penicillin into the aqueous layer. The layers are separated and the chloroform solution concentrated to a small volume. The concentrated chloroform solution of the N-ethylpiperidine salt of penicillin is then treated with acetone and the mixture is allowed to stand for one hour whereupon the N-ethylpiperidine salt of penicillin G precipitates.

An alternative method for the crystallization of the crude N-ethylpiperidine salt of penicillin G involves treating a chloroform solution of the salt with a sodium chloride solution. The chloroform solution and aqueous solutions are separated and the chloroform solution treated with butanol. The chloroform is removed by evaporation and the N-ethyl salt precipitated from butanol. It is also possible to carry out this reaction eliminating the pre-treatment with sodium chloride.

Generally the above procedure is sufficient. However if further purification is required, then the N-ethylpiperidine salt of penicillin G can be recrystallized by dissolving the salt in chloroform, concentrating the solution to a small volume and diluting with acetone.

Conversion of the N-ethylpiperidine salt of penicillin G to sodium penicillin G or calcium penicillin G is accomplished by dissolving the N-ethylpiperidine salt in water and adding amyl acetate. Sufficient dilute sodium hydroxide or calcium hydroxide is added to the above mixture to adjust the pH of the solution to approximately 6.5. The alkali is added at such a rate that the temperature of the reaction does not exceed 3° C. In this manner the sodium or calcium penicillin G is extracted into the aqueous layer and the N-ethylpiperidine is extracted into the amyl acetate. The two layers are separated. The aqueous layer is washed with amyl acetate. Amorphous sodium penicillin is recovered from the aqueous solution by freezing the solution and drying under vacuum. An essentially pure product is obtained. N-ethylpiperidine is soluble in amyl acetate, and can be recovered from the amyl acetate layer.

The amorphous sodium penicillin G thus obtained can be crystallized by stirring the product with butanol until solution is accomplished. Crystallization begins almost immediately.

In the event that a very low potency penicillin of the order of 200 u./mg. to about 400 u./mg. and of very bad color is used as the starting material, it has been found that a pretreatment with pyridine is preferable. This procedure involves diluting an aqueous solution of low potency penicillin with ether, adjusting the pH of the reaction to 2.5, and treating the ether solution with pyridine. The impurities are thrown out by the pyridine and the oily layer of impurities is removed. The purified ether solution of penicillin is then reacted with an ether solution of N-substituted heterocyclic amine to precipitate the N-substituted heterocyclic amine salt of penicillin G.

The following examples illustrate a method of carrying out the present invention, but it is to be understood that these examples are given by way of illustration and not of limitation.

*Example 1*

A solution of 25.0 g. of clinical sodium penicillin (activity 950 u./mg.) dissolved in 120 cc. of distilled water is cooled to 0° C. in an ice bath, with stirring, and diluted with 120 cc. of cold amyl acetate. The pH of the cold (0° C.) stirred solution is adjusted to 2.7 by the addition of a solution of 6.0 cc. of 85% phosphoric acid in 44 cc. of water. The mixture is separated and the aqueous layer is treated with 25 cc. of cold amyl acetate and sufficient phosphoric acid solution to adjust the pH of the solution to 2.5. It is necessary to keep the amyl acetate solution and the aqueous layer cold, at all times, to prevent penicillin decomposition. The layers are separated and the amyl acetate combined with the original extract. The extraction is repeated with an additional 25 cc. of amyl acetate. The combined extracts are washed with 25 cc. of cold distilled water and dried by shaking with sufficient anhydrous sodium sulfate (10–15 g.) to give a clear solution. The sodium sulfate is removed by filtration and washed by slurrying on the filter with 10 cc. of cold amyl acetate. Bioassay of the aqueous solutions obtained from the extraction and washing operation showed no significant penicillin activity.

140 cc. of cold acetone is added to the cold amyl acetate solution which contains penicillin acid. To this cold, stirred solution is added a cold solution of 8.0 g. of N-ethylpiperidine in 40 cc. of acetone which adjusts the pH of the solution to 7 with acutint paper. The mixture is stirred at 0° C. for one hour during which time crystallization of the granular N-ethylpiperidine salt of penicillin G is complete. In order to facilitate crystallization, seeds of the N-ethylpiperidine salt of penicillin G may be added to the solution, after 20% of the N-ethyl piperidine solution has been added. The solution is filtered and the crystals slurried with 25 cc. of acetone, filtered and slurried once with 25 cc. of acetone. The crystalline product is then sucked for one hour under a rubber dam and finally dried at 25° C. in vacuo. 15.95 g. of a pale yellow granular product having an optical rotation of $$(a)_D^{25} = 227°$$

when measured in ½% solution in water and an activity of 1327 u./mg. which represents an 89.2% recovery of activity, was thus obtained. N-ethyl piperidine is an essentially quantitative precipitant for penicillin G for clinical batches that run high in G content. The activity recovery, at this point, will vary from batch to batch depending on the penicillin G content. In this case the penicillin G content of the starting material was established by other methods to be around 90%.

Crystallization of the crude N-ethylpiperidine salt of penicillin G involves dissolving 20.0 g. of the crude salt in 85 cc. of chloroform. The yellow colored solution is extracted with 1×9 cc. followed by 1×5 cc. of a saturated sodium chloride solution. Most of the color is thereby extracted into the aqueous layers. The combined aqueous extracts are washed two times with 10 cc. portions of chloroform and the almost colorless chloroform extracts combined with the main chloroform solution. The chloroform solution is dried over 5–10 g. of anhydrous sodium sulfate, filtered and concentrated in vacuo to approximately 40 cc. volume. The mixture is diluted with 100 cc. of acetone and cooled at 0° C. for one hour whereupon the N-ethylpiperidine salt of penicillin G precipitates. The crystals are separated from solution by filtration, slurried two times with a minimum volume of acetone and dried at 25° C. in vacuo. The crystals thus obtained had a melting point of 156–157° C. with decomposition and an optical rotation of $$(\alpha)_D^{25} = 239°$$

when measured in ½% solution in water. 17.2 g. of essentially pure salt was recovered representing an 86% recovery. A second crop is obtained by concentrating to 3–4 cc. volume and diluting with 30 cc. of acetone. 0.43 g. of the desired crystals which had an optical rotation of $(\alpha)_D^{25} = 239°$ when measured in ½% solution were obtained. The above represents a total recovery of 88.15%.

An alternative method for the crystallization of crude N-ethylpiperidine salt of penicillin G involves treating the salt with chloroform and butanol. 100 g. of crude N-ethylpiperidine salt of penicillin G obtained as above is dissolved in 450 cc. of chloroform, treated with activated charcoal and diluted with 500 cc. of butanol. The mixture is then concentrated in vacuo until all of the chloroform has been removed. The N-ethylpiperidine salt of penicillin G crystallizes out throughout the concentration. The mixture is cooled at 0° C. for 40 minutes, filtered and washed three times with 100 cc. portions of cold butanol followed by two times 100 cc. portions of acetone. The colorless product is dried at 25° C. in vacuo.

A second crop is obtained by concentrating in vacuo to approximately 75 cc., brining, filtering, washing with acetone and drying in vacuo. 81.7 g. of the desired product was obtained from the first crop and 7.8 g. from the second crop. This represents an 89.5% recovery. The crystals had an optical rotation of $(\alpha)_D^{25} = 239°$ when measured in ½% solution in water and had a melting point of 156–157° C. with decomposition.

Treatment of a chloroform solution of the N-ethylpiperidine salt of penicillin G with brine, as described above, followed by dilution with butanol and concentration gives a colorless product in 83.6% yield. These crystals had an optical rotation of $(\alpha)_D^{25} = 239°$ when measured in ½% solution in water and a melting point of 156–157° C. with decomposition.

Generally, the N-ethylpiperidine salt of penicillin G is pure at this stage and is essentially free from small amounts of pigments. At times, however, with poorer starting materials, a second recrystallization is required in order to remove the last traces of color. This is done as follows 1 part of the N-ethylpiperidine salt of penicillin G obtained as above is dissolved in about 6 cc. of chloroform. The solution is concentrated in vacuo to about 2 cc. volume and diluted with 18 cc. of acetone. The mixture is cooled in an ice bath at 0° C. for one hour to precipitate the N-ethylpiperidine salt of penicillin G. The mixture is then filtered and the crystals slurried two times with a minimum volume of acetone. The colorless product is dried at 25° C. in vacuo. A recovery of about 96% is obtained.

The N-ethylpiperidine salt of penicillin G is converted to pure sodium penicillin G by dissolving 6.0 g. of the pure N-ethylpiperidine salt in 35.8 cc. of cold water (carbon dioxide free) and covering the aqueous layer with 67 cc. of cold amyl acetate. The mixture is stirred at 0° C. and treated with 13.5 cc. of 0.9955 N sodium hydroxide (carbonate free). The alkali is added at such a rate that the temperature does not exceed 3° C. The two layers are separated and the aqueous layer extracted two times with 35 cc. of cold amyl acetate. The aqueous layer which has a pH of 7, is frozen and dried under vacuum to give 4.78 g. of essentially pure colorless sodium penicillin G. This represents 100% of theory. The product had an optical rotation of $(\alpha)_D^{25} = 292.5°$ when 100 mg. was measured in 25 cc. water.

Bioassay showed S. aureus 1652 u./mg.

If calcium hydroxide is used in place of sodium hydroxide, pure calcium penicillin G is obtained.

The above represents a 76% overall recovery of activity from clinical penicillin as sodium penicillin G.

Anal. Calcd. for $C_{16}H_{17}N_2SO_4Na$: C, 53.93; H, 4.81; N, 7.86.

Found: C, 54.08; H, 5.02; N, 7.74.

The N-ethylpiperidine is recovered from the amyl acetate layer by adding 2.5 N hydrochloric acid to the amyl acetate until acid to moist Congo. The layers are separated and the aqueous layer made alkaline with 30% sodium hydroxide. The N-ethylpiperidine is separated, dried over potassium hydroxide pellets and distilled at atmospheric pressure.

Crystallization of the sodium penicillin G obtained above is accomplished by stirring a mixture of 5.0 g. of the product and 15 cc. of butanol until the sodium penicillin G dissolves and then crystallizes from solution. The mixture is cooled at 0° C. for five hours, filtered, slurried two times with a minimum volume of acetone and dried in vacuo. 4.66 g. (93.2% recovery) of crystalline sodium penicillin G is obtained.

*Example 2*

Two liters of an aqueous solution containing low potency penicillin (activity of dried solid about 300 u./mg.) is cooled to 0° C. and shaken with 1200 ml. of chilled alcohol-free ether. The pH of the solution is adjusted to 2.5 by the dropwise addition of 150 ml. of 10% phosphoric acid. The water layer is drawn off and 500 ml. of chilled ether added. 50 ml. of 10% phosphoric acid is then added to adjust the pH of the aqueous solution to 2.2. The layers are separated and the water again extracted with 300 ml. of chilled ether. The combined ether extracts are washed twice with 200 ml. portions of chilled water, dried over anhydrous sodium sulfate and filtered.

100 ml. of a 10% solution of pyridine in ether is added to the ether solution obtained above with stirring. After one hour, the ether and oil layers have separated and the ether layer is decanted.

The ether solution is cooled to 0° C. and 300 ml. of a 10% solution of N-ethylpiperidine in ether is added portionwise over a period of four hours. The solution is allowed to stand for fourteen hours and then the ether which has separated from the oily crystalline material is decanted and saved. The oil-crystal mixture remaining is stirred with 300 ml. of acetone and 300 ml. of ether are added until a slight clouding is observed. The mixture is then allowed to stand for twelve hours and filtered. The crystals are slurried with 200 ml. of chilled acetone, thoroughly washed on the filter with cold acetone and dried. The material is recrystallized by dissolving it in 200 ml. of chloroform at 50° C., adding 800 ml. of acetone, chilling for twelve hours filtering, washing and drying. These crystals, N-ethylpiperidine penicillin G, have a melting point of 156-157° C. with decomposition and an optical rotation $(\alpha)_D^{25} = +238°$ when 7 mg. were measured in 2 ml. of water.

Anal. Calcd. for $C_{23}H_{33}N_3O_4S$: C, 61.71; H, 7.43; N, 9.39.
Found: C, 61.70; H, 7.36; N, 9.33.

A second crop of crystals is obtained by concentrating the mother liquors to 20 ml. under vacuum at 25° C. and adding 10 ml. of chloroform and 120 cc. of acetone. The mixture is then chilled for twelve hours, filtered, washed and dried. These crystals had a melting point of 156-157° C.

Anal. Calcd. for $C_{23}H_{33}N_3O_4S$: C, 61.71; H, 7.43; N, 9.39.
Found: C, 61.44; H, 7.53; N, 9.47.

30 g. of the N-ethylpiperidine salt of penicillin G is dissolved in 100 ml. of chilled water and shaken with 250 ml. of chilled ether solution. To this solution 50 ml. of a cold 10% phosphoric acid solution are added portionwise with shaking to adjust the pH of the solution to 2.5. The layers are separated and the water layer extracted with 100 ml. of ether and 3 ml. of 10% phosphoric acid added to adjust the pH of the solution to 2.2. The ether extracts are combined and washed with two 50 ml. portions of chilled water which are combined, neutralized and set aside. The ether solution is extracted into 100 ml. of chilled water by adding portionwise 26 ml. of 2.5 N cold sodium hydroxide solution to give a pH of 6.0. The layers are separated and the ether again extracted with 50 ml. of chilled water to which 4 ml. of alkali is added to adjust the pH to 6.5. Another 25 ml. extraction is made to pH 7.2. The extracts are combined and the pH of the solution adjusted to 6.2 with a few drops more of alkali. The solution is then frozen and dried in vacuum to produce amorphous sodium penicillin G.

If calcium hydroxide is used in place of sodium hydroxide, pure calcium penicillin G is obtained.

The amorphous product obtained above is dissolved in 90 ml. of 85% acetone-water mixture, filtered and 900 ml. of acetone added. Sodium penicillin G crystallizes from solution. The reaction proceeds for twelve hours. The solution is then filtered, the crystals washed well with acetone and dried. This material is crystallized by dissolving it in 95 ml. of butanol saturated with water. This solution is filtered, 500 cc. of butanol are added to the filtrate and the solution allowed to stand overnight. It is then filtered, washed with acetone and dried. The sodium penicillin obtained had an optical rotation of $(\alpha)_D^{25} = +298°$ when measured in water.

Anal. Calcd. for $C_{16}H_{17}N_2O_4SNa$: C, 53.93; H, 4.81; N, 7.86.
Found: C, 53.74; H, 4.95; N, 7.93.

The various fractions obtained during the reaction can be converted to clinical sodium penicillin. The recovery of these fractions is carried out in the usual manner.

*Example 3*

In accordance with a procedure similar to that described in Example 2, sodium penicillin is converted to the N-methylpiperidine salt of penicillin G. Sodium penicillin (activity about 1000 u./mg.) is dissolved in water to make up the rich water solution, acidified and extracted into ether. The ether solution is cooled, treated with pyridine and impurities removed with the pyridine layer. An ether solution of N-methylpiperidine is added to the ether layer obtained above and the N-methylpiperidine salt of penicillin G recovered. The product is purified in the manner described above. The N-methylpiperidine thus obtained has a melting point of 135-136° C. and an optical rotation of $(\alpha)_D^{25} = +244°$ when 10 mg. was measured in 2 ml. of water.

*Example 4*

In accordance with a procedure similar to that described in Example 2, sodium penicillin is converted to the N-ethylmorpholine salt of penicillin G. A rich penicillin solution (62,000 u./ml.) is acidified and extracted into ether. The ether solution is cooled, treated with pyridine and impurities removed with the pyridine layer. An ether solution of N-ethylmorpholine is added to the ether layer obtained above and the N-ethylmorpholine salt of penicillin G recovered. The product is purified in the manner described above. These crystals have a melting point of 140-141° C. and an optical rotation $(\alpha)_D^{25} = 238°$ when 10 mg. are measured in 2 ml. of water.

Anal. Calcd. for $C_{22}H_{31}N_3O_5S$: C, 58.77; H, 6.95; N, 9.34.
Found: C, 58.78; H, 7.39; N, 9.30.

Various changes and modifications may be made in our process, certain preferred embodiments of which are described herein, which changes and modifications would, nevertheless, be within the scope of our invention. It is our intention that such changes and modifications, to the extent that they are within the scope of the appended claims, shall be considered as part of our invention.

We claim:
1. N-ethylpiperidine salt of penicillin G.
2. The process that comprises reacting an organic solvent solution of penicillin acid with an organic solvent solution of N-ethylpiperidine to form directly a crystalline precipitate of the N-ethylpiperidine salt of penicillin G.
3. The process that comprises reacting together in an organic solvent solution penicillin acid and N-ethylpiperidine to form directly a crystalline precipitate of the N-ethylpiperidine salt of penicillin G.
4. In a process for recovering penicillin G from crude penicillin comprising penicillin G and other forms of penicillin, the step that comprises reacting together in an organic solvent solution crude penicillin acid and N-ethylpiperidine to form a crystalline precipitate of the N-ethylpiperidine salt of penicillin G.

5. The process that comprises reacting together in an organic solvent solution penicillin acid and N-ethylpiperidine, and recovering from the reaction mixture the crystalline N-ethylpiperidine salt of penicillin G.

DONALD J. CRAM.
MAX TISHLER.

REFERENCES CITED

The following references are of record in the file of this patent:

UNITED STATES PATENTS

| Number | Name | Date |
|---|---|---|
| 2,115,250 | Bruson | Apr. 26, 1938 |
| 2,284,118 | Bock | May 26, 1942 |
| 2,461,038 | Cusic | Feb. 8, 1949 |
| 2,483,671 | Rieveschl | Oct. 4, 1949 |
| 2,493,625 | Goldberg et al. | Jan. 3, 1950 |
| 2,499,214 | De Benneville et al. | Feb. 28, 1950 |

OTHER REFERENCES

Abraham: British J. of Experimental Pathology, vol. 23, June 1942, No. 3, pp. 103–115.

Merck Report 15b, p. 1, March 31, 1944.

Heyden Report HIII, May 22, 1944, pp. 1, 2; HIV, pp. 1, 2, June 15, 1944.

Merck Report M-77, Sept. 28, 1945, pp. 1, 2 and 3.

Britain (Br. 234 CPS-687), Feb. 12, 1946, pp. 1 and 2.